United States Patent [19]

Holland-Letz

[11] 3,982,677

[45] Sept. 28, 1976

[54] DEVICE FOR LOCKING A MOVABLE FORM FEED

[75] Inventor: Güenter Holland-Letz, Paderborn-Wewer, Germany

[73] Assignee: Nixdorf Computer AG, Paderborn, Germany

[22] Filed: Apr. 23, 1975

[21] Appl. No.: 570,772

[30] Foreign Application Priority Data

Apr. 24, 1974 Germany ............................ 2419849

[52] U.S. Cl. .............................................. 226/75

[51] Int. Cl.² ......................................... G03B 1/30

[58] Field of Search .................. 226/74, 75, 79, 179

[56] References Cited

UNITED STATES PATENTS

| | | | |
|---|---|---|---|
| 2,482,108 | 9/1949 | Hageman | 226/74 X |
| 2,650,090 | 8/1953 | Davidson | 226/79 X |

*Primary Examiner*—Richard A. Schacher
*Attorney, Agent, or Firm*—Gifford, Chandler & Sheridan

[57] ABSTRACT

A form feed device having at least one form feed mounted in a frame so that it can be moved transversely to the feed direction on a slide shaft which itself can be turned between at least an open and a locking position.

12 Claims, 3 Drawing Figures

DEVICE FOR LOCKING A MOVABLE FORM FEED

BACKGROUND OF THE INVENTION

1. Field of the Invention

The invention relates to a form feed device incorporating means for locking a form feed therein against movement transverse to the feed direction.

2. Description of the Prior Art

Form feeds are employed, for example, in accounting machines in the manufacturing industry and in copying machines. With these feeds the sheet material, which is processed or furnished with information, is fed through a particular apparatus. It is necessary that the particular form feed be aligned accurately in the feed direction in order to ensure tilt-free guidance of the sheet material.

In general, it is desirable that, in the case of feed devices for sheet material, sheet sizes which are as large as possible can be conveyed while the space taken up by the feed devices is as small as possible. In accounting machines there is frequently the additional requirement that several forms be fed alongside one another, for which purpose several form feeds are then arranged so that they can be moved transversely to the feed direction on a guide. The form feeds are then usually constructed in such a way that they act on the edge of the particular forms to be conveyed, for which purpose the so-called Leporello principle may be employed. The forms can be provided with lateral perforations in which conveyor belts with pin feeds engage by means of pin elements, in order to thus further increase the feed reliability.

In the case of form feeds which can be moved transversely to the feed direction, there is a problem in locking the particular feed after adjustment to the size of the sheet material to be conveyed, such that it reliably retains a preset position, in order to ensure trouble-free feeding of the sheet material. The locking of the form feeds has hitherto been effected by means of stop levers or clamp levers or by means of clamping screws, which are arranged laterally on the particular feed and with which the feed can be fixed on a guide arranged in the direction of movement. These locking elements however can be complex and require additional space at the side of the feed which, for example, makes it impossible to arrange two form feeds immediately adjacent to one another, that is to say to move two feeds close against one another.

We have now devised a locking arrangement which is relatively simple and which does not require any space outside the form feed, so that the feed fitted with the device can be directly against a housing wall or against a neighboring form feed.

SUMMARY OF THE INVENTION

According to the invention, there is provided a form feed device which comprises at least one form feed mounted in a frame so that it can be moved transversely to the feed direction on a slide shaft which itself can be turned between at least an open and a locking position, a guide sleeve mounted on the slide shaft to be rotatable therewith and housed within, and rotatable with respect to, the form feed, the arrangement being such that when the shaft is rotated to a locking position, the form feed is releasably locked against transverse movement on the shaft by engagement of the sleeve directly or indirectly with the form feed.

Preferably, the sleeve is connected to an eccentric element within the form feed, which element rotates with the sleeve and is arranged to releasably bear against the form feed to lock the latter against said transverse movement when said shaft is rotated to a locking position. Preferably the eccentric element bears against a spring member mounted on the form feed, when the shaft is turned to a locking position.

By means of this device, it is possible to provide a lock for a form feed in a very simple manner, no elements which project beyond the side walls of the form feed being required for the lock. In addition it is found to be highly advantageous that the locking of the form feed can be carried out from a point outside the frame. For this purpose the shaft which serves as the slide guide has merely to be turned from an initial open position into a second locking position, which can easily be effected by an appropriate control knob. When the shaft is turned, the guide sleeve, which is held on the shaft in a non-twistable manner and which is arranged in the form feed, turns with it. The eccentric element, which acts on the spring member fastened on the form feed, turns with the guide sleeve. Since, due to its eccentricity, the eccentric element, when turned in a suitable direction, exerts an ever increasing force on the spring, a pressure is set up between the guide shaft and the form feed and leads to the form feed being braced on the guide shaft.

Advantageously, a polygonal, preferably hexagonal, shaft is provided as the slide guide. A shaft of suitable dimensions is readily obtainable, as is the sleeve which is guided on it in a movable manner. However, a circular shaft could also be provided, but this would have to be provided with at least one flattened region or a guide groove in order to ensure that the guide sleeve is non-rotatable with respect to the shaft.

The guide sleeve is preferably provided with a flange which forms the eccentric element. The total element thus formed can be made of a plastic material which ensures a soft action on locking.

A leaf spring, which rests against the periphery of the flange and is provided with an element which can lock into a groove on the flange periphery arranged at a maximum distance from the center of the shaft, is advantageously provided as the spring. This element can, for example, be constructed in such a way that the leaf spring is bent down sharply, to form a corner which can lock into the groove. When the point of maximum locking force is reached, the groove is then also on the stop element, which reliably ensures that the locking position thus reached does not alter of its own accord.

An operating device for the guide shaft can be provided outside the frame. For this purpose, a control knob can be arranged on the guide shaft itself but a lever transmission is also possible if the control knob is to be arranged at a point other than the bearing of the shaft or when larger turning angles of th control knob are to make smaller setting angles of the guide shaft possible. It is thus possible to make an adjustment to the operating requirements preset in each case.

DESCRIPTION OF THE DRAWINGS

In order that the invention may be more fully understood, one embodiment of a device according to the invention will now be described with reference to the accompanying drawing, in which.

DESCRIPTION OF A PREFERRED EMBODIMENT

Figure 1:
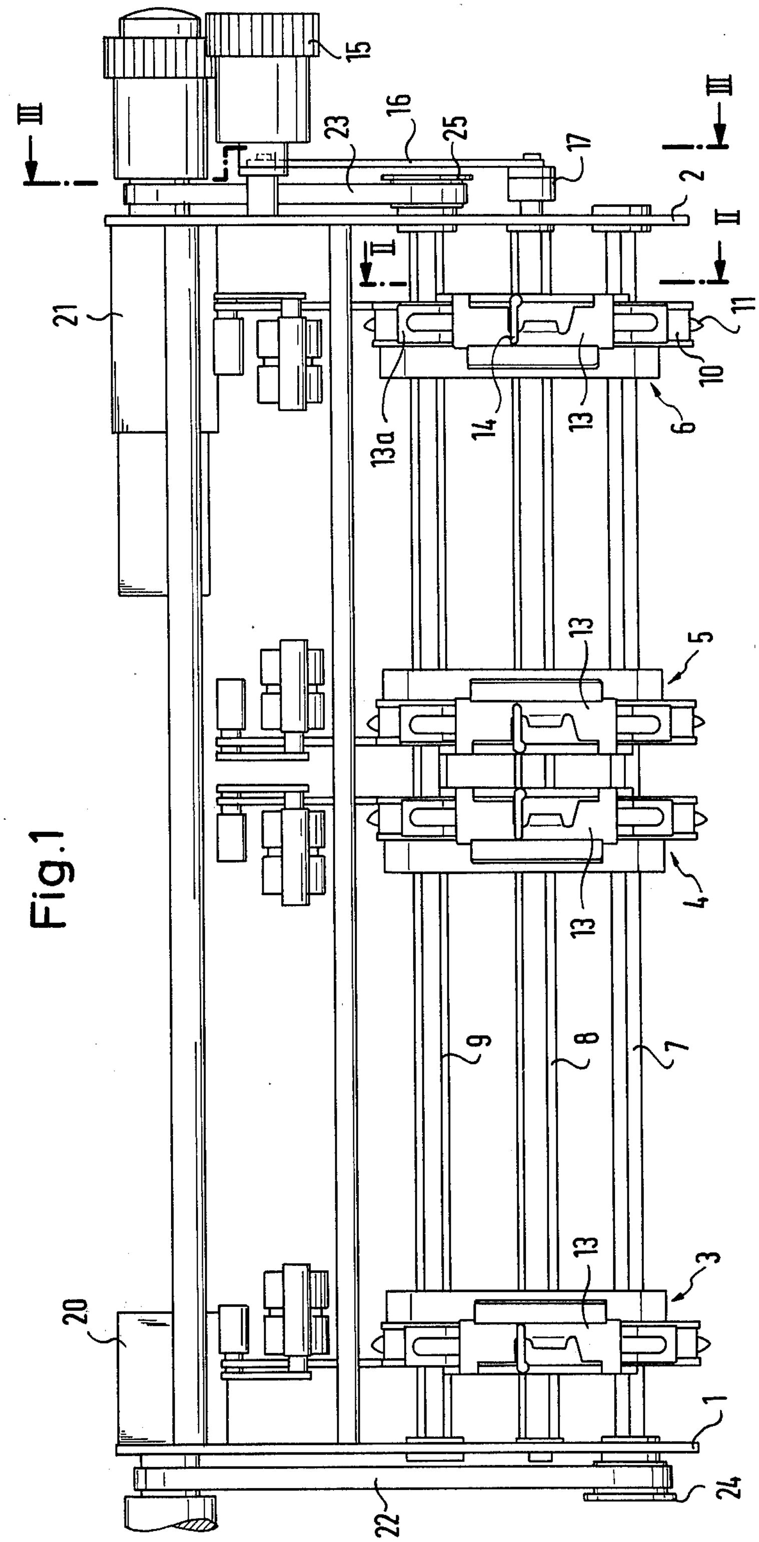
FIG. 1 is a plan view of the feed device for multiple-copy sets in an accounting machine.

Referring to the drawing, FIG. 1 shows a plan view of a feed device, which contains form feeds 3, 4, 5, and 6, which can be moved on guides, between two side sheet bars 1 and 2. Hexagonal guide shafts 7, 8 and 9 which run parallel to one another between the side sheet bars 1 and 2 and thus make movement of the form feeds 3, 4, 5 and 6 possible relative to one another and transversely to the feed direction, are provided as guides. Each form feed contains two drive rollers (not shown), which guide a pin feed 10, which is provided with pin elements 11.

A holding-down flap 13 is provided on each form feed and is held by means of a locking element 14 in a position such that it acts, together with a pressing element 13*a*, on a form which is not shown and presses this onto the particular pin feed. The forms to be conveyed by means of these form feeds are, of course, provided with perforations at their edges. However, form feeds which do not have pin elements 11 could be used.

The form feeds 3, 4, 5 and 6 can be fixed on the central guide shaft 8 by actuating a control knob 15 outside the frame formed by the side sheet bars 1 and 2, the knob making it possible, via a lever 16 and an eccentric element 17, to turn the guide shaft 8. By turning the guide shaft 8 a clamping force is applied, in a manner to be described, to the form feeds 3, 4, 5 and 6 in such a way that they sit firmly on the guide shaft 8. It is thus possible to adjust the four form feeds to the widths of two sets of forms which are to be fed continuously in the accounting machine.

The form feeds 3, 4, 5 and 6 are driven by means of two drive devices 20 and 21, each of which acts on one of the shafts 7 and 9 via a drive belt 22 and 23 respectively, and a drive roller 24 and 25 respectively. When these two drive shafts are coupled on the one hand, to the two form feeds 3 and 4 and, on the other hand, to the two form feeds 5 and 6, by their hexagonal profile engaging in corresponding axial openings in the feed rollers, it is possible to feed two sets of forms independently of one another, that is to say the form feeds 3 and 4 can carry out a feed operation while, at the same time, the form feeds 5 and 6 are stationary.

Figure 2:
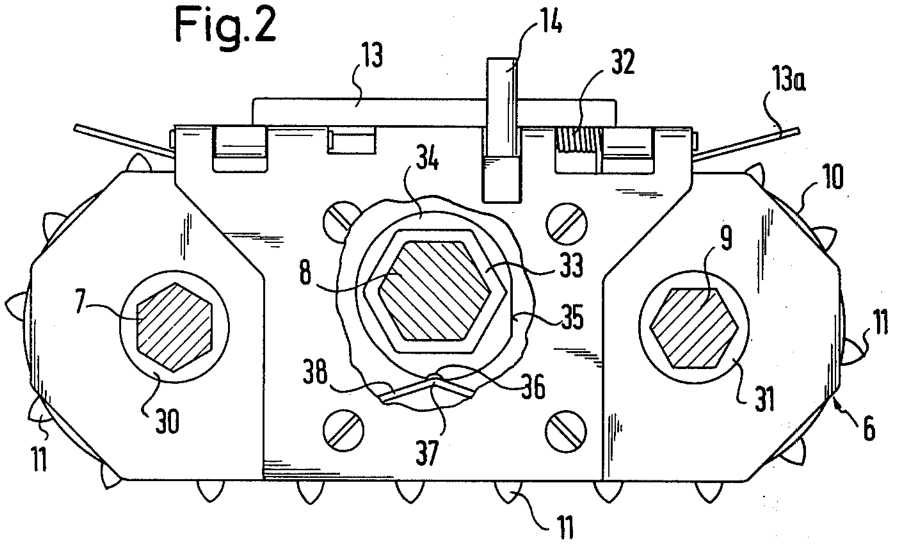
FIG. 2 is a side view of a form feed, which is provided with a feed device according to FIG. 1, in the direction of II—II of FIG. 1.

In FIG. 2, the three guide shafts 7, 8 and 9 on which the form feeds sit and can be moved transversely to the feed direction, can be seen. The pin feed 10 (with the pin elements 11) which is guided on two rollers 30 and 31, is also shown. Suitable clutch elements inside the feed (which are not shown) ensure that the pin feed 10 is driven by only one of the shafts 7 and 9.

The holding-down flap 13, which is held in the horizontal holding-down position shown here by the lever 14 but which, due to the force of a spring 32, moves into an opening position when this lever is turned, can also be seen in FIG. 2.

Part of the interior of the form feed 6 is also shown in the form of a through section in FIG. 2. It can be seen that a guide sleeve 33, the inner orifice of which is suited to the profile of the hexagonal shaft 8, is arranged inside the form feed 6. The guide sleeve 33 is made of a plastic material and is provided with a flange 34, which has an eccentric outer periphery. The distance of the outer periphery of the flange 34 from the center of the guide shaft 8 is a minimum at the point 35 and a maximum at the point 36. At 36 a groove is provided in the periphery of the eccentric flange 34 and, in the position shown, acts on the corner 37 of a leaf spring 38, which is fastened in the form feed 6.

In the position shown in FIG. 2 with the corner 37 of the leaf spring 38 abutting the groove 36 the leaf spring 38 exerts a pressure on the flange 34 of the sleeve 33. This pressure is transmitted to the shaft 8 and due to this pressure, the form feed is rigidly clamped to the guide shaft 8. Conversely, this pressure is relieved when the shaft 8 with the guide sleeve 33 is rotated until the corner 37 of the spring 38 abuts against the flange 34 at point 35 thus permitting the position of the form feed to be slidably adjusted along the shafts 7, 8, and 9. Nevertheless, the guide shafts 7 and 9 can be turned from outside, so that the rollers 30 and 31, or only one of these rollers, are also turned and the pin feed 10 is driven.

The guide sleeve 33, together with the flange 34, can consist of a single plastic element and be held inside the form feed 6 without special bearings, so that when the form feed 6 is dismantled from the frame of the feed device shown in FIG. 1, it falls out of the feed. Independently of the material of this element, a coating made of a material which increases the friction on the guide shaft 8, for example, rubber, can be provided inside the sleeve part.

Figure 3:
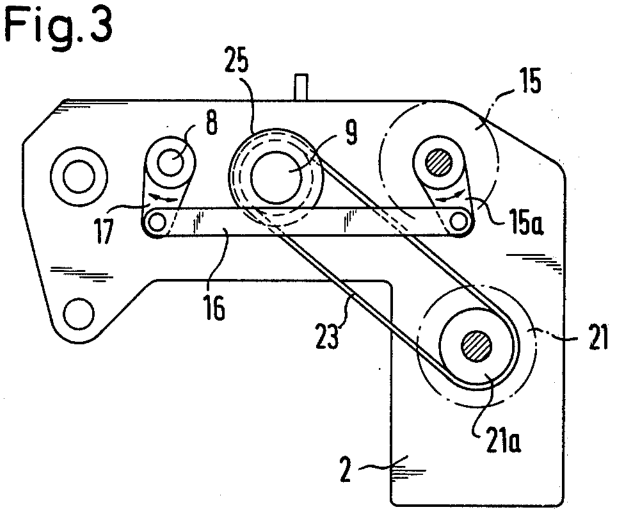
FIG. 3 is a side view of an adjusting device for locking in the direction III—III of FIG. 1.

FIG. 3 shows an adjusting device with which a form feed can be locked on the guide shaft 8. This device comprises a control knob 15, shown by a dot-and-dash line, on the shaft of which a lever arm 15*a* is fixed. This arm can be swivelled by turning the control knob 15 which actuates a further lever 16 and turns the guide shaft 8 via an eccentric element 17. However, an arrangement of a control knob directly on the guide shaft 8 would also be possible.

FIG. 3 also shows the drive for the guide shaft 9, which is effected by a drive device 21 behind the side sheet bar 2, via a drive roller 21*a* and a drive belt 23 as well as a further roller 25, which is arranged on the shaft 9. It can be seen that, by means of the principle of an operating device for locking the guide shaft 8 and for releasing the lock, which is shown, it is possible to arrange a control knob 15 at an optimum point outside the frame of the feed device.

A particular advantage of the invention is to be seen in the fact that when several form feeds are used to feed multiple-copy sets, it is possible to lock, for example, in each case two form feeds, and to release the lock on each form feed independently of one another. This is effected in a simple manner by slipping the eccentric elements or flanges 34 of the individual form feeds, when they are assembled in a feed device and turned towards one another, onto the guide shaft 8. In this way it is possible, in the case of several operating positions of the guide shaft 8, to lock selected form feeds in each case but to leave other form feeds, the eccentric elements of which do not act on the particular spring 38 in this operating position of the guide shaft 8, in the position in which the lock is released. Similarly then, at a predetermined position of the guide shaft 8, the eccentric elements 34 of all form feeds having positions at a maximum distance from the center of the guide shaft 8 can act on the leaf springs 38 allocated to them, so that, in this operation position, all the form feeds are then locked. For example, it is conceivable to release a first set of form feeds from the lock in this last described operating position by turning in the first direction, while another set of form feeds is released from the lock in this operating position by turning in the second direction. In this case the guide sleeves of the individual sets of form feeds would, in each case, have to be arranged in positions on the guide shaft 8 which correspond but which are reversed with respect to the other sets.

I claim:

1. A form feed device for feeding forms in a feed direction comprising:

a frame having a slide shaft disposed generally transversely to the feed direction, a form feed slidably disposed along said slide shaft, means for rotating said slide shaft to a predetermined rotational locking position, and means for locking said form feed at any axial position along said shaft upon the rotation of said slide shaft to said predetermined rotational position.

2. A device according to claim 1, wherein said means for locking comprises a sleeve secured against rotation to said slide shaft and being connected to an eccentric element within the form feed so that said element rotates with the sleeve, wherein said element is arranged to releasably bear against the form feed to lock said form feed against said transverse movement on said slide shaft when said slide shaft is rotated to said locking position.

3. A device according to claim 2, wherein the eccentric element bears against a spring member to the form feed, when the slide shaft is rotated to said locking position.

4. A device according to claim 2, wherein the slide shaft has a polygonal cross-section and wherein said sleeve includes an axial bore of polygonal cross-section adapted to slidably receive the slide shaft therethrough.

5. A device according to claim 2 wherein the eccentric element is formed as a flange on the sleeve.

6. A device according to claim 3 wherein the spring member is a leaf spring, which is arranged to rest against the periphery of the eccentric element and is provided with a lockable part which can lock into a groove on that part of the eccentric element periphery furthermost from the axis of the slide shaft.

7. A device according to claim 6, wherein the lockable part is formed as a corner of the spring.

8. A device according to claim 5, wherein the sleeve and the flange are constructed as a single plastic element.

9. A device according to claim 1 and including a control knob provided outside the frame for turning the slide shaft between its said positions.

10. A device according to claim 9, wherein the control knob is coupled to the slide shaft by a lever transmission.

11. A device according to claim 1 and including at least two form feeds, means for locking said form feeds to said slide shaft independently of each other by rotation of the slide shaft between at least two locking positions.

12. The invention as defined in claim 1, wherein said means for rotating said slide shaft are disposed exteriorly of said frame.

* * * * *